United States Patent [19]

Zimmermann et al.

[11] Patent Number: 4,515,173

[45] Date of Patent: May 7, 1985

[54] FAST SHUTTER APPARATUS

[75] Inventors: Eugene L. Zimmermann, Santa Fe; Don R. Kania, Los Alamos, both of N. Mex.

[73] Assignee: The United States of America as represented by the United States Department of Energy, Washington, D.C.

[21] Appl. No.: 625,322

[22] Filed: Jun. 27, 1984

[51] Int. Cl.³ ............................................. F16K 13/04
[52] U.S. Cl. ................. 137/68 R; 137/68 A; 251/62
[58] Field of Search ............. 251/62; 137/68 R, 68 A, 137/71

[56] References Cited

U.S. PATENT DOCUMENTS

| | | | |
|---|---|---|---|
| 3,358,961 | 12/1967 | Montgomery et al. | 251/11 |
| 3,739,796 | 6/1973 | Jablansky | 137/68 A |
| 4,084,602 | 4/1978 | Cook | 137/68 A |
| 4,108,195 | 8/1978 | Berry | 137/68 A |

FOREIGN PATENT DOCUMENTS

| | | | |
|---|---|---|---|
| 457836 | 4/1975 | U.S.S.R. | 137/68 A |
| 499439 | 4/1976 | U.S.S.R. | 137/68 A |
| 549637 | 4/1977 | U.S.S.R. | 137/68 R |
| 573658 | 9/1977 | U.S.S.R. | 137/68 R |
| 889999 | 12/1981 | U.S.S.R. | 137/68 A |

Primary Examiner—Samuel Scott
Assistant Examiner—Allen J. Flanigan
Attorney, Agent, or Firm—Lee W. Huffman; Paul D. Gaetjens; Judson R. Hightower

[57] ABSTRACT

An apparatus for protecting diagnostic equipment from blast damage by rapidly interposing a shutter between the equipment and the blast area. The apparatus comprises a sensor for sensing a trigger signal associated with the blast and for converting it into a voltage pulse. The voltage pulse is received by the first end of a firing pin. A pressure chamber holds a gas under pressure. The second end of the firing pin is located inside the pressure chamber and is located above a foil member covering an orifice. When the voltage pulse reaches the second end, a point-to-plane discharge ruptures the foil, allowing the gas to enter a drive housing and quickly move a drive piston away from the foil. A drive rod connects the drive piston to a shutter and as the drive piston is moved down, the shutter moves into a closed position, protecting the equipment from debris.

7 Claims, 1 Drawing Figure

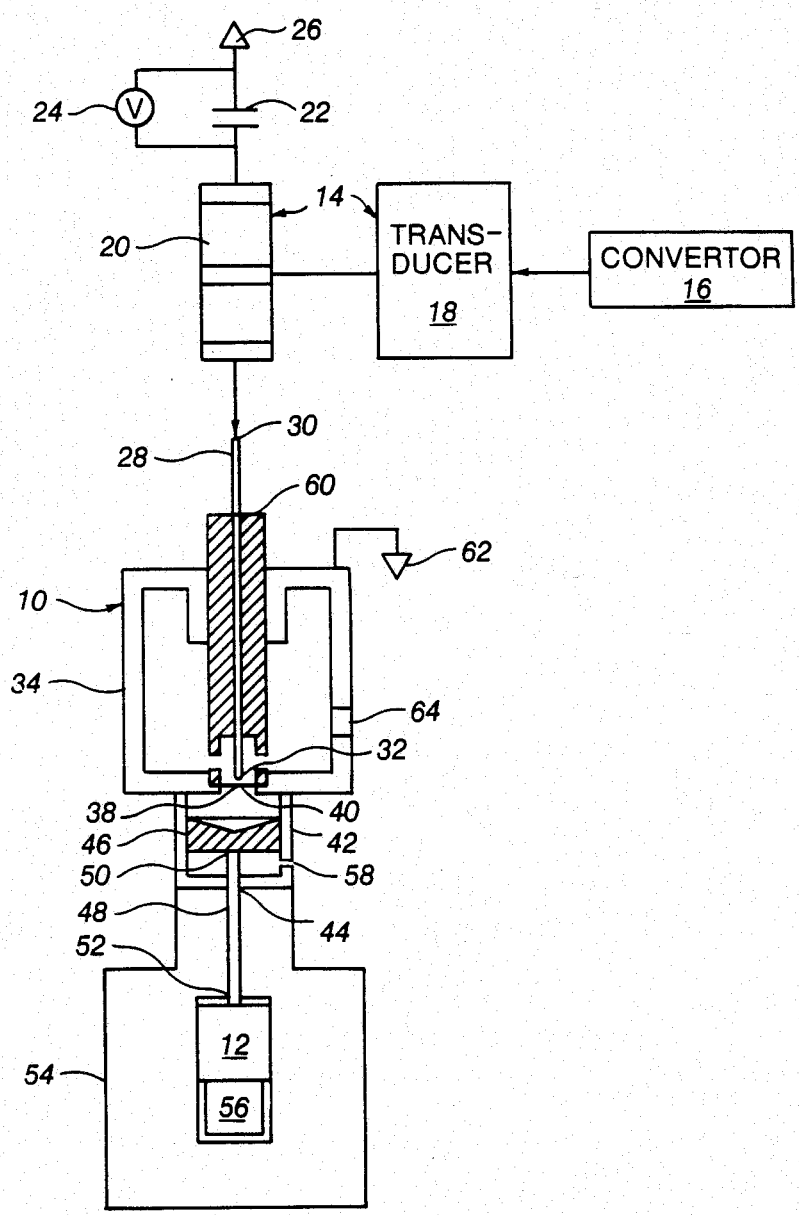
Figure

4,515,173

FAST SHUTTER APPARATUS

This invention is the result of a contract with the Department of Energy (Contract No. W-7405-ENG-36).

BACKGROUND OF THE INVENTION

The invention described herein relates generally to fast shutters and more particularly to fast shutters for protecting diagnostic equipment from blast damage.

The use of fast shutters to protect diagnostic instruments is well known. Such shutters are also used to protect humans and vacuum systems from x-rays, gases and explosive debris. In known shutter systems, an explosive charge is used to move a shutter into position. These systems have several disadvantages. The explosive charge poses a personnel hazard, particularly if it goes off accidently. These systems are difficult to reset for subsequent measurements. It is highly desirable to design a high speed shutter which overcomes these disadvantages.

SUMMARY OF THE INVENTION

One object of the present invention is to provide an improved high speed shutter apparatus.

Another object of the invention is to protect diagnostic equipment from blast damage.

Still another object of the invention is to provide a high speed shutter apparatus that does not employ an explosive to close the shutter.

To achieve the foregoing and other objects, and in accordance with the purposes of the present invention, as embodied and broadly described herein, there is provided an apparatus for providing protection from blast damage by rapidly interposing a shutter between an area to be protected and the blast area. The apparatus comprises a sensor that converts a trigger signal associated with the blast into a voltage pulse. A firing pin with first and second ends, the first end electrically connected to the sensor, receives the voltage pulse. A pressure chamber holding a first gas under pressure has a portion defining an orifice. The pressure chamber is disposed about the second end of the firing pin. A metal foil member sealably covers the orifice. The second end of the firing pin is located above the orifice. An insulator is disposed around and separates the firing pin from the pressure chamber. A drive housing is connected to the pressure chamber. It has a portion that encloses the orifice and a portion defining a drive housing aperture. The drive housing aperture is located opposite from the foil member. A drive piston is located within and sealably engages the drive housing. The drive piston is slidable within the drive housing from a first position adjacent the foil member to a second position spaced apart from the foil member. A drive rod with first and second ends is slidably passable through the drive housing aperture, the first end being connected to the drive piston. A shutter housing has a portion defining a shutter aperture and is located beneath the drive housing. A shutter is connected to the second end of the drive rod and is movable from an open position to a closed position to cover the shutter aperture. After the sensor receives a trigger signal and converts it into a voltage pulse, the voltage pulse passes from the first end to the second end of the firing pin and a point-to-plane discharge occurs rupturing the foil member. The first gas under pressure in the pressure chamber enters the drive housing and moves the drive piston from the first position to the second position, thus moving the shutter into the closed position to cover the shutter aperture. The voltage pulse can be about 10 kV. The foil member is preferably titanium and can have a thickness of about 0.38 mm. The second end of the firing pin can be located about 0.3 mm above the foil member. The drive housing can contain a second gas at a second pressure and can include a portion defining an escape aperture. The escape aperture is disposed beneath the drive piston when the drive piston is in the first position adjacent the foil member. As the drive piston moves down towards the escape aperture, the second gas is expelled through the escape aperture and the speed with which the first gas under pressure moves the drive piston is substantially unaffected by the energy needed to displace the second gas.

One advantage of the present invention is that it is compatible with vacuum systems.

Another advantage of the invention is that it is safe.

Still another advantage of the invention is that trigger signals of different types can be used.

Yet another advantage of the invention is that it has a low probability of self-triggering.

Another advantage of the invention is that the shutter speed can be varied by varying the gas pressure.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawing, which is incorporated in and forms a part of the specification, illustrates an embodiment of the present invention and, together with the description, serves to explain the principles of the invention. In the drawing:

THE FIGURE shows a schematic illustration of the electrical portion of a preferred embodiment of the invention and a cross-sectional view of the mechanical portion of a preferred embodiment of the invention.

DETAILED DESCRIPTION OF THE INVENTION

Reference is now made to the FIGURE, which shows a preferred embodiment of the invention. The present invention is an apparatus 10 for providing protection from blast damage by rapidly interposing a shutter 12 between an area to be protected and the blast area. The apparatus 10 comprises a sensor means 14 for sensing a trigger signal associated with the blast. The trigger signal can be optical, electrical or pressure. Sensor means 14 converts the trigger signal into a voltage pulse. Sensor means 14 includes a convertor means 16, a transducer 18, a spark gap 20, a capacitor 22, a charging supply 24 and a first ground 26. Convertor means 16 converts the trigger signal into a trigger pulse. Transducer 18 converts the trigger pulse into a fast-rising 5 kV pulse. A standard spark gap 20 is responsive to transducer 18 and discharges capacitor 22 to a firing pin 28. Firing pin 28 has a first end 30 and a second end 32. First end 30 is electrically connected to spark gap 20. Second end 32 is disposed within a pressure chamber 34, which holds a first gas, such as nitrogen or any non-explosive gas, under pressure. Pressure chamber 34 has a portion defining an orifice 38. Foil member 40 covers orifice 38 and prevents the first gas from leaking out of pressure chamber 34. Second end 32 of firing pin 28 is located above foil member 40. Foil member 40 is preferably made of titanium and has a thickness of about 0.38 mm. Second end 32 of firing pin 28 is preferably about 0.3 mm above foil member 40. Using nitrogen gas with a gauge pressure of 160 psi, an average delay of 670 $\mu$s from trigger pulse to closure of shutter 12 was obtained, with a jitter (average variation) of 400 ns. This delay time will probably be affected by varying the gas pressure. The separation between foil member 40 and second end 32 can be varied, but if the distance is too great, the voltage pulse may not reach foil member 40. The voltage pulse can be about 10 kV.

Drive housing 42 is connected to pressure chamber 34. Drive housing 42 has a portion enclosing orifice 38 and a portion defining a drive housing aperture 44, which is located opposite from foil member 40. A drive piston 46 is located within and sealably engages drive housing 42. Drive piston 46 can slide within drive housing 42 from a first position adjacent foil member 40 to a second position spaced apart from foil member 40. In the FIGURE, drive piston 46 is shown between these two positions. A drive rod 48 can slide through drive housing aperture 44. Drive rod 48 has a first end 50 connected to drive piston 46 and a second end 52 connected to shutter 12. A shutter housing 54 is disposed beneath and may, as shown, be connected to drive housing 42. Shutter housing 54 has a portion defining a shutter aperture 56.

When the phenomena of interest occurs, such as an explosion, and diagnostic instruments (not shown) need to be protected before debris from the explosion reaches them, sensor means 14 receives a trigger signal associated with the explosion and converts it into a voltage pulse. The voltage pulse moves from first end 30 to second end 32 and a point-to-plane discharge occurs rupturing foil member 40, allowing first gas under pressure in pressure chamber 34 to enter drive housing 42. A second gas can be in drive housing 42 at a second pressure. The second pressure can be at or near zero i.e. a vacuum. Drive piston 46 is quickly moved from a first position adjacent foil member 40 to a second position, moving shutter 12 from an open position (as shown) to a closed position covering shutter aperture 56, thus protecting the diagnostic equipment.

Drive housing 42 can include a portion defining an escape aperture 58 which is located beneath drive piston 46 when drive piston 46 is adjacent foil member 40. As drive piston moves down towards escape aperture 58, the second gas is drive housing 42 is expelled through escape aperture 58. Consequently, the speed with which the first gas under pressure moves the drive piston is substantially unaffected by the energy needed to displace the second gas.

An insulator 60 is located around and separates firing pin 28 from pressure chamber 34. Second ground 62 can provide further protection from the voltage pulse. Foil member 40 can be easily replaced and drive piston 46 can be reset at the first position adjacent foil member 40. Gas under pressure can be introduced into pressure chamber 34 through port 64.

The foregoing description of the preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for providing protection from blast damage by rapidly interposing a shutter between an area to be protected and the blast area, said apparatus comprising:
   a. sensor means for sensing a trigger signal associated with the blast and for converting the trigger signal into a voltage pulse of sufficient magnitude to create a discharge;
   b. a firing pin for receiving said voltage pulse, said firing pin having first and second ends, said first end being electrically connected to said sensor means;
   c. a pressure chamber holding a first gas under pressure, said pressure chamber having a portion defining an orifice, said pressure chamber disposed about and having said orifice disposed beneath said second end of said firing pin;
   d. an insulator disposed around and separating said firing pin from said pressure chamber;
   e. a metal foil member sealably covering said orifice of said pressure chamber;
   f. a drive housing connected to said pressure chamber, said drive housing having a portion which encloses said orifice and having a portion defining a drive housing aperture, said drive housing aperture located opposite from said foil member;
   g. a drive piston disposed within and sealably engaging said drive housing, said drive piston being slidable within said drive housing from a first position adjacent said foil member to a second position spaced apart from said foil member;
   h. a drive rod having first and second ends, said first end being connected to said drive piston, said drive rod being slidably passable through said drive housing aperture;
   i. a shutter housing having a portion defining a shutter aperture, said shutter housing being disposed beneath said drive housing; and
   j. a shutter for moving from an open position to a closed position to cover said shutter aperture, said shutter being connected to said second end of said drive rod, whereby after said sensor means receives a trigger signal and converts it into said voltage pulse, said voltage pulse passes from said first end to said second end of said firing pin and a point-to-plane discharge occurs rupturing said foil member, allowing said first gas in said pressure chamber to enter said drive housing and move said drive piston from said first position to said second position, moving said shutter into said closed position to cover said shutter aperture.

2. The invention of claim 1, wherein said voltage pulse is about 10 kV.

3. The invention of claim 1, wherein said metal foil member comprises titanium.

4. The invention of claim 3, wherein said titanium foil member has a thickness of about 0.38 mm.

5. The invention of claim 1, wherein said foil member is disposed within about 0.3 mm of said second end of said firing pin.

6. The invention of claim 1, wherein said driving housing contains a second gas at a second pressure.

7. The invention of claim 6, wherein said drive housing includes a portion defining an escape aperture, said escape aperture being disposed beneath said drive piston when said drive piston is disposed in said first position adjacent said foil member, so that as said drive piston moves down towards said escape aperture, said second gas is expelled through said escape aperture and consequently the speed with which said first gas under pressure moves said drive piston is substantially unaffected by the energy needed to displace said second gas.

* * * * *